United States Patent
Yamada

[11] Patent Number: 5,822,204
[45] Date of Patent: Oct. 13, 1998

[54] SYSTEM CONTROL BASED ON CONTROL CASES AND USING OPTIMIZATION RULES

[75] Inventor: Kunio Yamada, Ebina, Japan

[73] Assignee: Fuji Xerox Co., Ltd., Tokyo, Japan

[21] Appl. No.: 627,074

[22] Filed: Apr. 3, 1996

[30] Foreign Application Priority Data

Apr. 6, 1995 [JP] Japan .................................... 7-081196

[51] Int. Cl.$^6$ .................................................. G05B 13/02
[52] U.S. Cl. ........................... 364/148; 364/149; 364/159
[58] Field of Search .................................. 364/148, 157, 364/474.08, 156, 139, 158, 159, 149; 395/50, 51

[56] References Cited

U.S. PATENT DOCUMENTS

| | | | |
|---|---|---|---|
| 5,012,430 | 4/1991 | Sakurai | 364/148 |
| 5,119,287 | 6/1992 | Nakamura et al. | 364/148 |
| 5,161,142 | 11/1992 | Okano | 369/50 |
| 5,195,172 | 3/1993 | Elad et al. | 395/50 |
| 5,272,428 | 12/1993 | Spiegel et al. | 318/803 |
| 5,295,061 | 3/1994 | Katayama et al. | 364/157 |
| 5,301,101 | 4/1994 | MacArthur et al. | 364/156 |
| 5,428,712 | 6/1995 | Elad et al. | 395/51 |
| 5,430,642 | 7/1995 | Nakajima et al. | 364/148 |
| 5,499,319 | 3/1996 | Sultan et al. | 395/3 |
| 5,517,420 | 5/1996 | Kisman et al. | 364/474.08 |
| 5,541,832 | 7/1996 | Nakajima et al. | 364/148 |

FOREIGN PATENT DOCUMENTS

| | | |
|---|---|---|
| A-2-311860 | 12/1990 | Japan . |
| A-5-150989 | 6/1993 | Japan . |
| A-6-217572 | 8/1994 | Japan . |
| A-6-218824 | 8/1994 | Japan . |
| 8-137146 | 5/1996 | Japan . |
| 8-137510 | 5/1996 | Japan . |

*Primary Examiner*—Reba I. Elmore
*Assistant Examiner*—McDieunel Marc
*Attorney, Agent, or Firm*—Oliff & Berridge, PLC

[57] ABSTRACT

A target density accomplishment line is a line at which a control case plane and a target density plane intersect each other. If present control contents are plotted on the target density accomplishment line, it means that a target density is accomplished. It is not correct to say that any point on the target density accomplishment line can be employed. A point on the target density accomplishment line which should be employed needs to also satisfy optimization rules for respective manipulated variables. By applying bias and laser power optimization rules are applied to the points on the target density accomplishment line, a combination of bias and laser power set values that maximizes the product of bias and laser power optimization rule satisfaction levels is selected.

20 Claims, 10 Drawing Sheets

SYSTEM CONTROL BASED ON CONTROL CASES AND USING OPTIMIZATION RULES

BACKGROUND OF THE INVENTION

1. Field of the Invention

This invention relates to a system controller that can perform well-balanced control on a plurality of items without causing a secondary fault.

2. Description of the Related Art

Hitherto, various methods for system control have been used widely, most of which specify an output item to be controlled (output characteristic value) and control a controlled system so that only the output item reaches a target value.

In motors, for instance, if only a single characteristic value such as the rotating speed is controlled, in many cases a satisfactory result can be produced. However, in image formation apparatuses and the like, a satisfactory result cannot be obtained unless various image quality determining factors are controlled for an output image.

Thus, if it is attempted to control a system involving a variety of output items by using the prior art techniques, several control operations need to be performed in a parallel manner.

For example, keeping the image density in a good value nd lessening fog (image dirt on a white field) as much as possible are often desired as required output characteristics for image formation apparatuses such as copiers. However, if the density is set to a sufficiently high value, fog easily appears; if fog is suppressed, the density lowers.

Therefore, according to the conventional control method, a controller that can control the density and fog independently is required; for example, the following system is used.

First, a reference density patch is formed on a photosensitive body and its density is detected and fed back to the toner density. That is, the mixed ratio between the toner and carrier in the developer is changed in response to the detected density of the reference density patch for adjusting the toner supply amount. On the other hand, for the fog, the deposited toner amount on a non-image portion is sensed and fed back to the cleaning potential. That is, the set voltage of a charger is increased or decreased in response to the deposited toner amount.

Thus, the conventional controller uses separate methods for each control item and performs control using them in combination.

However, as the types of output items to be controlled increase, it becomes impossible to control the items individually, because one control operation contends with another, causing interference and an out-of-control condition in addition to the reasons of complicating the controller and increasing its costs. That is, the setting for optimizing the output characteristic of item A may contradict that for optimizing the output characteristic of item B.

If only several main characteristic values are optimized, other unexpected characteristic values may be sacrificed. Particularly for the image formation apparatuses as described above, optimum control focusing attention only on density and fog conditions may result in occurrence of other various image quality defects.

For example, as a result of lowering the toner density to remedy a state in which the density becomes too much high, scavenging in the developer may occur, causing a scratch-like defect called a brush mark on an output image.

If only the main characteristic values are optimized, the set values themselves may become abnormal and control components such as a drive power unit and the target system itself may hard used, shortening the controller life.

In the prior art, usually a window or a limiter is provided for each set value so as not to set unreasonable values exceeding the window or limiter. However, unless values are set exceeding the window or limiter, the characteristic values of the controlled objects cannot be made to reach the target values, leading to insufficient control.

Further, if a state that the set value is much closer to the limit continues for a long term, the controller life, etc., is adversely affected although the set value is within the limit. This is because the window or limiter is set as wide as possible at the design time to enhance the control characteristics as much as possible. In contrast, to provide a long life, the window or limiter setting must be narrowed, in which case the control performance becomes insufficient more and more.

A reasoning method based on past cases (case-based reasoning (CBR)) is proposed as a new recognition and reasoning technique, for example, in Japanese Unexamined Patent Publication No. Hei. 5-150989. Since the method does not depend only on rules obtained experimentally by experts, it solves a problem in expert systems. Also, since profound understanding of the operation mechanism of the controlled object is not required, the method also solves a problem in model-based reasoning. A new technique also applicable to controllers as an improvement on the method is developed (Japanese Patent Application Nos. Hei. 6-217572 and Hei. 6-218824).

The controller using the technique can be designed with a controlled system as a black box without the need for drawing wide knowledge of the controlled system for optimum design or previously collecting experimental data, etc., for optimum adjustment; while performing the control operation, the controller itself can gather the control contents as control cases and automatically extract control rules for producing target system output.

Therefore, the engineer can be relieved of previous data collection and analysis on the controlled system, and the controller can also adapt to the effect of operating environment or time-varying degradation after shipment of the controller or state change of the controlled system because of parts replacement by the user. That is, the controller has an excellent capability of automatically following any system gain variation in the controlled system.

However, an unexpected secondary fault may occur in the controller based on control cases although the controller has excellent performance. This topic will be discussed.

To control five output items in the other prior art, control is performed separately for each item based on the control rule set fixedly by the engineer. If even one of the output items exceeds the set limit, additional control is not executed. (In such a case, a warning is output to the user, for example.) On the other hand, according to the method based on control cases, a more appropriate control rule is newly extracted for the control item on which attention is focused, so that the target values for all the five output items can be accomplished regardless of setting within limits. However, in the new technique, characteristics may be degraded for output items on which attention is not focused. That is, in the example, although the set values in all the five output items are within the limits, the possibility that their synergistic effect may cause fault in another output characteristic value on which no attention is focused appears.

For example, when control is executed an three types of image quality characteristics of the maximum density, fog, and gradation linearity as controlled objects in an image formation apparatus, desired maximum density, fog suppression, and gradation linearity can be accomplished under wider environmental conditions than ever. However, a combination of manipulated variable set values for accomplishing them may cause a secondary fault such as trail edge deletion to occur.

In such a case, in the prior art other than the control method based on control cases, the engineer previously sets the control rule used for control, thus can previously analyze the secondary fault and add his or her experience and knowledge for setting the limiter more safely. That is, the secondary fault can be lowered. However, at the time, a narrower window or severer limits are set, reduction in the control capability is inevitable.

On the other hand, in the control method based on control cases, control rules are acquired through the actual control operation, thus previous analysis on control rules cannot be executed. Since means for incorporating engineer's experience and knowledge is not provided, window or limiter optimization as used in the other prior art cannot be performed either.

Thus, means for preventing a secondary fault is not established in the method based on control cases. If it is attempted to suppress a secondary fault in the same manner as in the other prior art, previous data collection and analysis must be performed, and large constraints are received because of the window or limiter, thus the greatest merit of the control method based on control cases is lost.

SUMMARY OF THE INVENTION

It is therefore an object of the invention to provide a system controller that can suppress a secondary fault without impairing the advantages of the control method based on control cases.

It is another object of the invention to provide, irrespective of the control method based on control cases, a general-purpose system controller that can perform well-balanced control on a plurality of control items and easily prevent a secondary fault from occurring.

To attain the above objects, according to the invention, there is provided a system controller for controlling, based on a given control rule, a controlled system so that one or a plurality of controlled variables reach respective target values, the system controller storing optimization rules for respective manipulated variables a; first detector for detecting combinations of values of the respective manipulated variables which combinations allow the respective controlled variables to reach the respective target values; a second detector for detecting, from the combinations detected by the first detector, a combination that provides a maximum satisfaction level of the optimization rules; and a controller for controlling the controlled system by using the values of the manipulated variables detected by the second detector, wherein the number of the manipulated variables is set greater than the number of the controlled variables.

With this configuration, while the controlled variable is controlled so as to reach the target value, a combination of values of the manipulated variables is not determined only from the control rule because the number of manipulated variables is greater than that of controlled variables. That is, a plurality of combinations of manipulated variables are detected by the first detector. While referencing the optimization rules for the respective manipulated variables, the second detector determines a combination of values of the manipulated variables which combination provides the maximum product or sum of satisfaction levels of the optimization rules. Thus, well-balanced control can be performed on a plurality of control items and a secondary fault can be prevented.

According to another aspect of the invention, there is provided a system controller for controlling a controlled system so that one or a plurality of controlled variables reach target values by using a control rule that is automatically extracted based on past control cases, the system controller storing optimization rules for respective manipulated variables; a first detector for detecting combinations of values of the respective manipulated variables which combinations allow the respective controlled variables to reach the respective target values; a second detector for detecting, from the combinations detected by the first detector, a combination that provides a maximum satisfaction level of the optimization rules; and a controller for controlling the controlled system by using the values of the manipulated variables detected by the second detector, wherein the number of the manipulated variables is set greater than the number of the controlled variables.

With this configuration, since a control rule is automatically extracted based on past control cases, control can be adapted to a system state variation caused by a variation in the environment, degradation over time, part replacement by a user, or the like. In addition, well-balanced control can be performed on a plurality of control items and a secondary fault can be prevented by the first and second detecting means as in the case of the first configuration.

The optimization rules may be defined by respective fuzzy membership functions. In this case, each controlled variable can be controlled so as to have a more desirable value.

The fuzzy membership functions may be weighted for the respective manipulated variables. In this case, control can be performed so as to reflect the degrees of importance of the respective manipulated variables, to become appropriate for the current situation.

DESCRIPTION OF THE PREFERRED EMBODIMENTS

Embodiment 1

A. Configuration

A first embodiment of the invention will be discussed with reference to the accompanying drawings. This embodiment is an example of applying the invention to an electrophotographic image formation apparatus.

(1) Image output section

Figure 2:
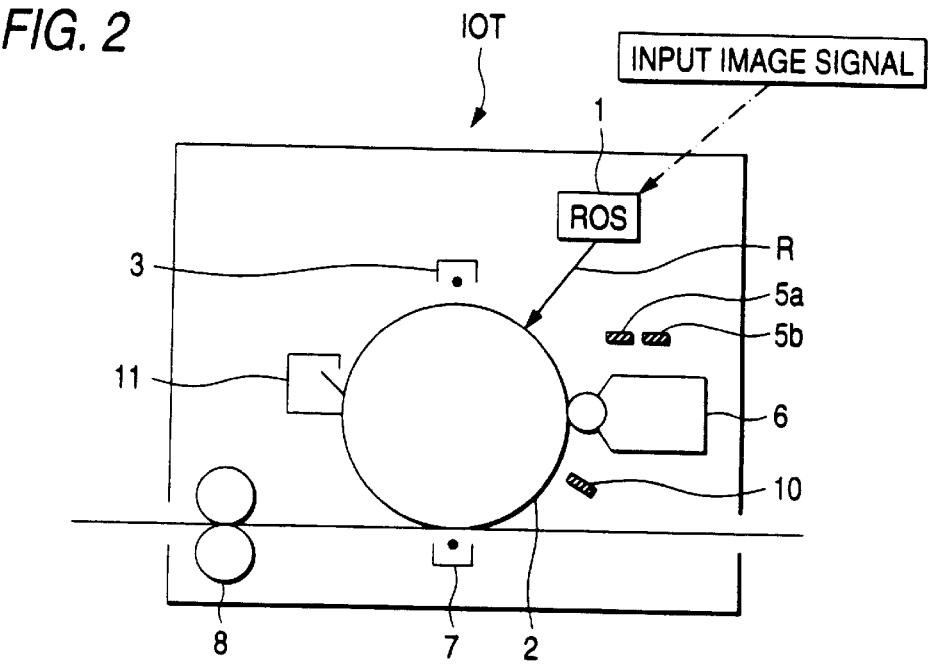
FIG. 2 is an illustration to show an outlined configuration of an image output section in the first embodiment.

First, FIG. 2 outlines an image output section IOT (image output terminal) in an image formation apparatus in the embodiment, wherein an image reading section and an image processing section are omitted, namely, only the electrophotographic image output section IOT is shown.

An image formation procedure will be discussed with reference to FIG. 2. First, the image processing section (not shown) performs proper processing for an original image signal provided by reading an original document through the image read section (not shown) or an original image signal generated by an external computer (not shown), etc. This original image signal is input to a laser output section 1 for modulating laser light R. Raster irradiation with the laser light R modulated by the input image signal is provided on a photoreceptor 2.

On the other hand, when the photoreceptor 2 is uniformly charged by a scorotron charger 3 and is irradiated with the laser light R, an electrostatic latent image corresponding to the input image signal is formed on the surface of the photoreceptor 2. Next, the electrostatic latent image is toner developed by a developer 6 and the development toner is transferred to paper (not shown) by a transfer unit 7 and fixed by a fixing unit 8. After this, the photoreceptor 2 is cleaned by a cleaner 11 and one image formation operation is complete. Numeral 10 is a development density sensor for detecting the density of a development patch (described below) formed outside an image area.

(2) Development patch generation monitoring mechanisms

Figure 3:
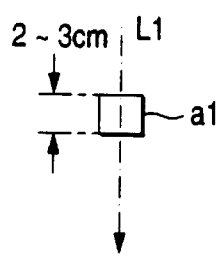
FIG. 3 is a plan view to show a density patch prepared in the first embodiment.
Figure 4:
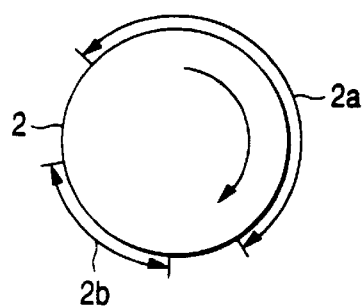
FIG. 4 is an illustration to show a preparation position of the density patch in the first embodiment.

Development patch generation and monitoring mechanisms in the embodiment will be discussed. The development patch is used to monitor the output image density and is generated so as to have a predetermined density. In the embodiment, the development patch is sized about 2–3 square cm as denoted by a1 in FIG. 3 and is formed so as to have a solid density (dot coverage: 100%). The development patch a1 is formed outside an image area of the photoreceptor 2. That is, as shown in FIG. 4, after a latent image is formed in an image area 2a, the density patch a1 is formed in an empty area 2b.

The development density sensor 10 consists of an LED application section for applying light to the surface of the photoreceptor 2 and a photosensor for receiving specularly reflected light or diffused light from the surface of the photoreceptor 2. A line L1 shown in FIG. 3 is a detection line of the development density sensor 10 and the density patch a1 is formed on the detection line L1.

Figure 5:
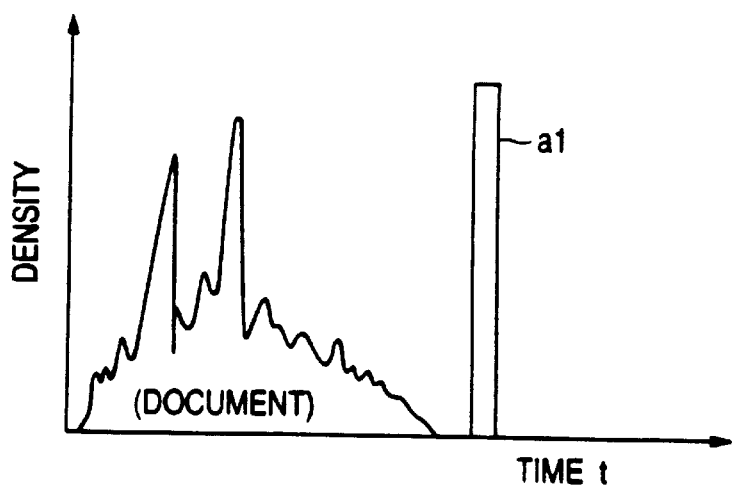
FIG. 5 is a graph to show an example of an output signal of a development density sensor in the first embodiment.

FIG. 5 is a graph to show an example of an output signal of the development density sensor 10. As shown, a density detection signal responsive to a document image is provided first, and then a density detection signal of the density patch a1 is provided. The density patch a1, which is formed outside the image area, is not transferred to paper, and is erased when it passes through the cleaner 11.

In the embodiment, the density of the development patch is detected because it highly correlates with the density of a fixed image provided for the user (final image density) and the development patch can be erased by the cleaner 11. The development patch may be formed in the image area during a period other than the image formation period.

(3) Configuration of control section

Figure 1:
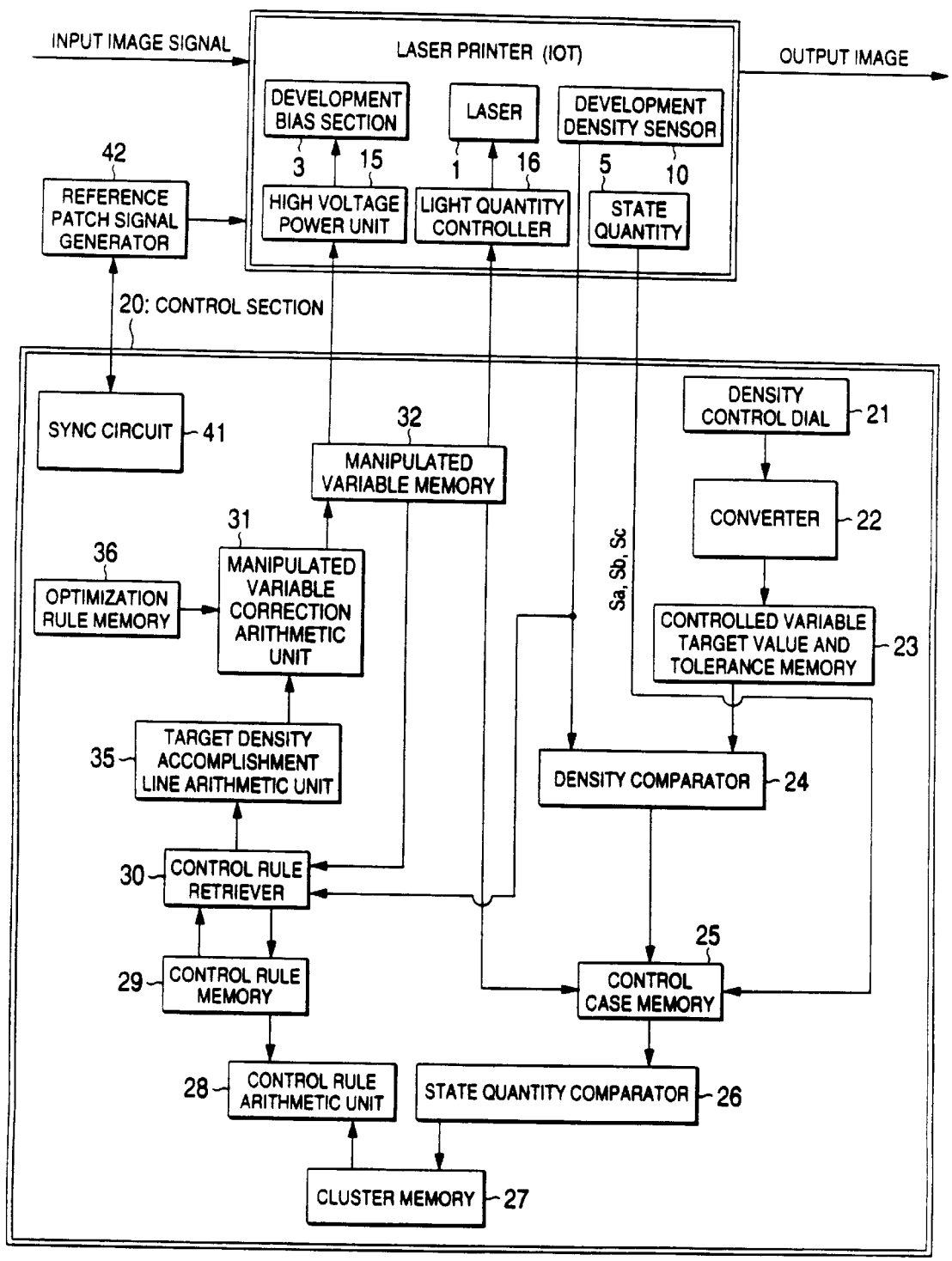
FIG. 1 is a block diagram to show the whole configuration of a first embodiment of the invention.

FIG. 1 is a block diagram to show the electric configuration of the embodiment, wherein numeral 20 denotes a control section which controls a laser output section 1 and a development bias section 3 for applying a bias to the developer 6.

In FIG. 1, numeral 21 is a density control dial for the operator to set a value responsive to a desired density. The set value of the density control dial 21 is converted by a converter 22 into a value corresponding to an output of the development density sensor 10 (in the embodiment, a value ranging from 0 to 255). The target density output from the converter 22 is stored in a controlled variable memory 23. In this case, the controlled variable memory 23 also stores a tolerance.

A density comparator 24 compares an output signal of the development density sensor 10 with an output signal of the memory 23. In this comparison, the tolerance stored in the memory 23 is referenced. If the difference between both the output signals is within the tolerance, the output signal of the development density sensor 10 is supplied to a control rule retriever 30; if the difference exceeds the tolerance, the output signal is supplied to a control case memory 25.

Numeral 5 denotes a state quantity detection section which has a temperature sensor 5a and a humidity sensor 5b shown in FIG. 2 and a sheet counter (not shown) for detecting the number of copy sheets. Output signals from the sensors and the counter are output as signals Sa (temperature), Sb (humidity), and Sc (number of sheets) to the control case memory 25 and a state quantity comparator 26.

The control case memory 25 is a memory which stores control cases each being a set of three types of quantities, that is, a state quantity, a manipulated variable, and a controlled variable. Control cases are thus stored because in the embodiment control is performed in various manners based on control cases stored in the past. This is a control technique based on the technique called case-based reasoning.

The state quantities stored in the control case memory 25 are the temperature, the humidity, and the cumulative number of print sheets indicated by the signals Sa, Sb, and Sc as described above. The reason why these are adopted as the state quantities in the embodiment is that they are external conditions producing a particularly large effect in an image formation process with an electrostatic mechanism as in the electrophotographic scheme and that the state of degradation over time of the apparatus itself can also be grasped from the cumulative number of print sheets. Therefore, it is understood that control cases having the temperature, the humidity, and the cumulative number of print sheets as state quantities can be used to extract an appropriate control rule.

The manipulated variable refers to the adjustment amount of a parameter that changes the output value to be controlled.

In the embodiment, manipulated variables are a bias set value of the development bias section 3 and a laser power set value (LP set value) ranging from 0 to 255. These two variables are used because they highly correlate with the density.

The bias set values and LP set values are stored in the manipulated variable memory 32 and the values corresponding to an output signal of a manipulated variable correction arithmetic unit 31 are read whenever necessary. The bias set value read from the manipulated variable memory 32 is supplied to a high-voltage power unit 15, which then applies a voltage responsive to the bias set value to the development bias section 3. The LP set value read from the manipulated variable memory 32 is supplied to a light quantity controller 16, which then feeds laser power responsive to the LP set value into the laser output section 1.

The output signal of the development density sensor 10 is stored in the control case 25 as a controlled variable. Resultantly, for example, control cases as listed in the following table are stored in the control case memory 25.

TABLE 1

|  | State Quantity Temp./Humidity/ CV | Manipulated variable Bias/LP | Controlled variable Density (sensor output value) |
| --- | --- | --- | --- |
| Case 1 | 22.1/54/1 | 88/36 | 185 |
| Case 2 | 22.2/54/2 | 78/51 | 191 |
| Case 3 | 22.0/55/3 | 98/76 | 176 |

In this table, in Case 1, the temperature, the humidity, and the cumulative number of print sheets as the state quantities are 22.1°, 54% and 1, the bias set value and LP set value as the manipulated variables are 88 and 36, and the controlled variable (density sensor output value) is 185. Likewise, in Case 2, the temperature, the humidity, and the cumulative number of print sheets as the state quantities are 22.2°, 54% and 2, the bias set value and LP set value as the manipulated variables are 78 and 51, and the controlled variable is 191. In this manner, combinations of the state quantities, manipulated variables, and controlled variable are recorded in the control case memory 25.

A state quantity comparator 26, a cluster memory 27, and a control rule arithmetic unit 28 shown in FIG. 1 have a function of extracting a control rule by referencing control cases stored in the control case memory 25 and the output signals S1, S2, and S3 of the state quantity detection section 5. The operation of these blocks will be discussed later in detail.

A control rule memory 29 is a memory for storing control rules calculated by the control rule arithmetic unit 28 and upon reception of a request from the control rule retriever 30, returns a control rule responsive to the request. In this case, the control rule retriever 30 requests the control rule memory 29 to return a control rule responsive to the density supplied from the development density sensor 10 and the manipulated variables supplied from the manipulated variable memory 32, namely, the LP set value and bias set value.

Figure 9:
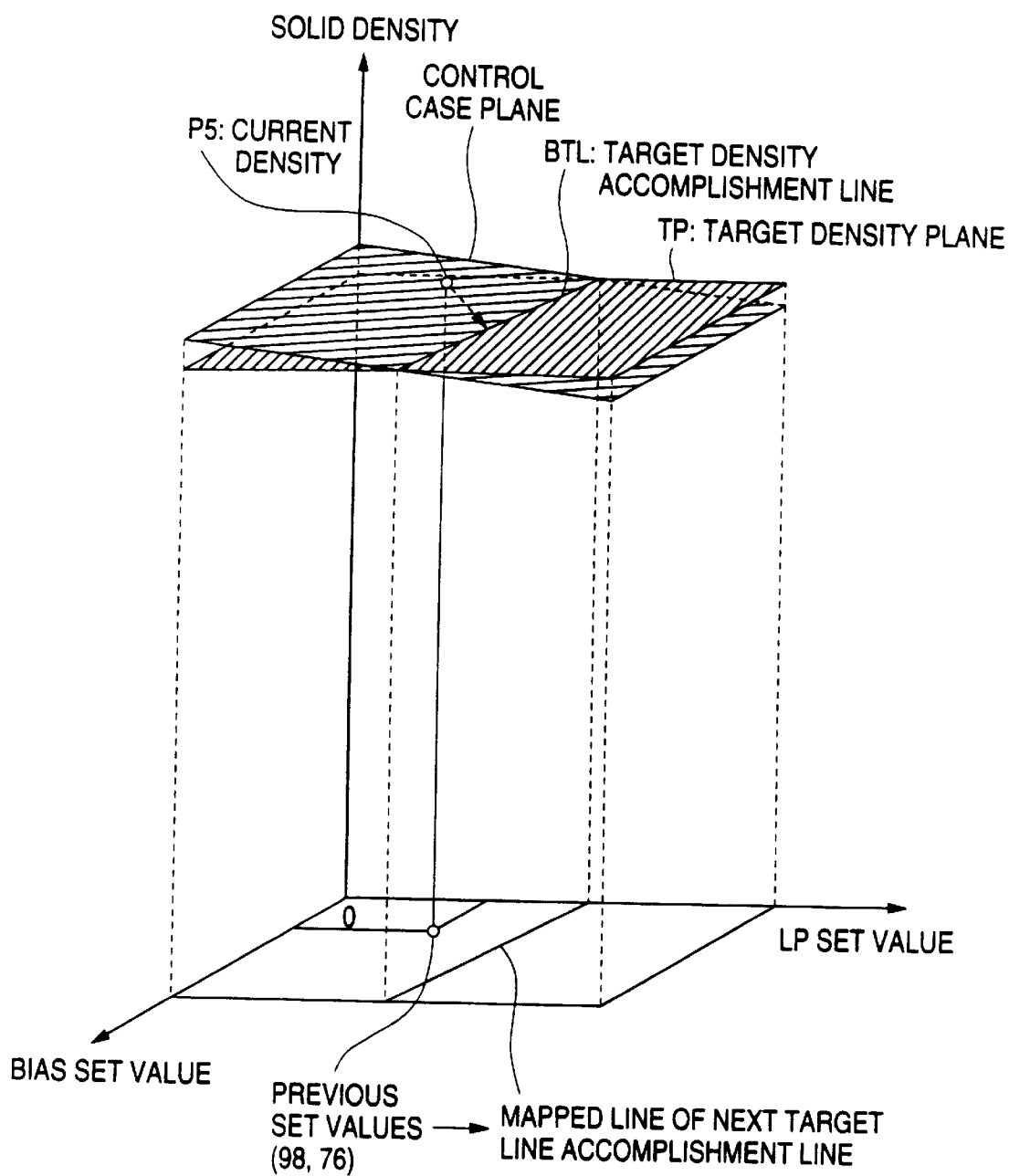
FIG. 9 is a conceptual drawing to show a target density accomplishment line in the first embodiment.

A target density accomplishment line arithmetic unit 35 uses the control rule retrieved by the control rule retriever 30 to calculate a combination of the development bias and LP set values for accomplishing the target density. The combination of both values is represented by a line BTL in a control case space shown in FIG. 9. That is, if the development bias and LP set values corresponding to a point on the line BTL shown in FIG. 9 are used, the target density can be accomplished.

An optimization rule memory 36 stores optimization rules for respective manipulated variable. For example, it stores a rule of FIG. 6 as a bias voltage optimization rule and a rule of FIG. 7 as an LP set value optimization rule. These rules are stored as fuzzy membership functions: they are set as closely prepared information such as "most desirable setting" and "a problem is liable to occur from around this region" decided by total consideration of a development engineer.

By the way, the set values of the manipulated variables in the controlled system (in the embodiment, 0–255) are correlated with physical quantities in an effective range. For example, the range of bias set values is made 0–255 so as to cover all expected cases and so as not to provide an abnormal setting that may cause a secondary fault. In the embodiment, a range of 280–535 V is assigned to 0–255. For example, if "127" is set, 407 V is executed. Thus, the highest resolution can be assigned while the necessary variable range is sufficiently covered.

Such work is often executed based on experience of the development engineer and individual data pieces of element technologies adopted for the system by totally deciding the controlled variable change width, physical environment of the market, or the life, safety factors, etc., of the system and discrete parts. Usually, the setting and assignment are complete in the specific job for each element. For example, for the bias voltage, the setting and assignment are complete at the specific development design time of the development technology.

However, at the same time, normally development engineers also recognize a fact that "this value or so is the most desirable setting if possible." Therefore, as described above, such a fact is stored in the optimization rule memory 36 as a fuzzy membership function, and this is referenced to find the final controlled variable.

Figure 6:
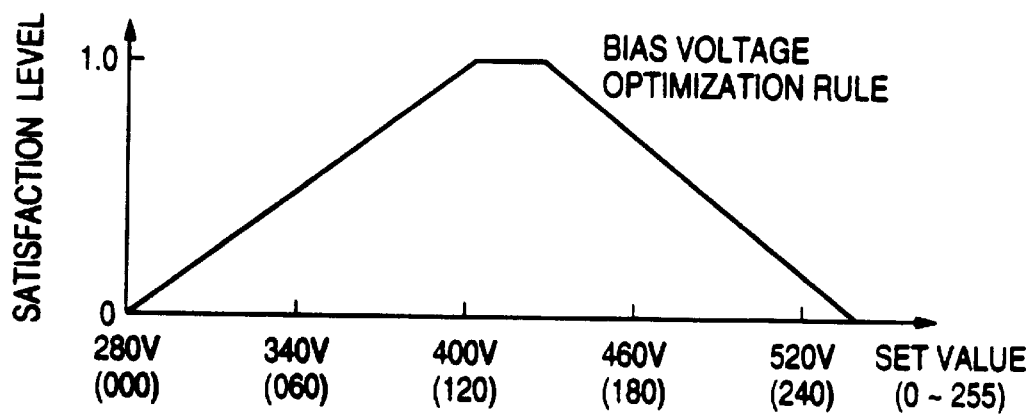
FIG. 6 is a graph to show a bias voltage optimization rule in the first embodiment.

In the example shown in FIG. 6, the most desirable values, namely, the region giving the peak of the membership function is 410–430 V and the membership function definition region (manipulated variable range) is 280–535 V. The fact that the peak position is not at the center of the definition region (407 V) is due to an additional, empirical judgement that from a total judgment in consideration of the power unit life, image defect occurrence, etc., it is safer if the variation width on the low voltage side of the optimum value is set wider and that on the high voltage side is set narrower. In this connection, such judgement does not necessarily require evaluation of the entire system but needs only data on the power supply specifications and phenomenal characteristics.

Figure 7:
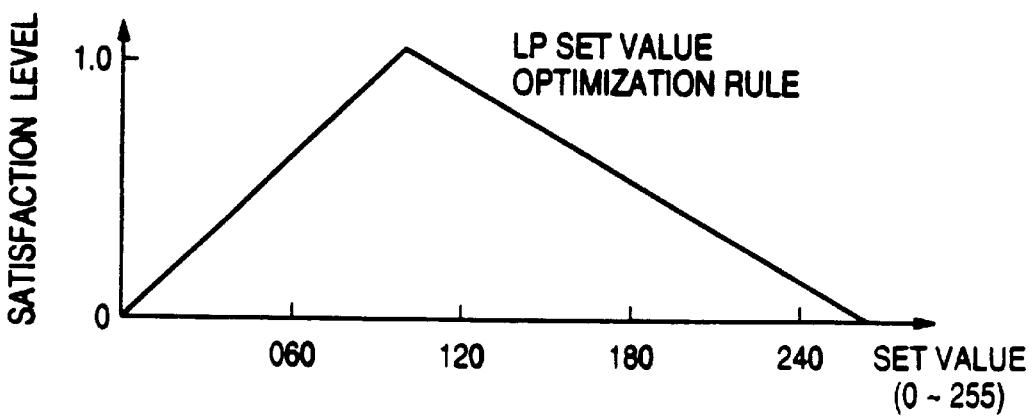
FIG. 7 is a graph to show an LP set value optimization rule in the first embodiment.

Likewise, the LP set value optimization rule is defined as a membership function as shown in FIG. 7 by additionally considering experiences. In this case, in view of degradation over time, a variation width in a direction of increasing power (raising the density) is set slightly wider.

In the embodiment, the optimization rules can be changed at any point in time as required. For example, if it becomes necessary to change an optimization rule at the maintenance time, the serviceman, etc., again sets both ends and the peak position of the membership function corresponding to the optimization rule. In this case, since only both ends and the peak position are again set, the optimization rule is changed extremely easily and special expert knowledge is not required.

The manipulated variable correction arithmetic unit 31 determines manipulated variable correction values based on the line supplied from the target density accomplishment line arithmetic unit 35 and the optimization rules stored in the optimization rule memory 36, and supplies the determined correction values to the manipulated variable memory 32, which then supplies the manipulated variables corresponding to the manipulated variable correction values, namely, the LP set value and bias set value to the high voltage power unit 15 and the light quantity controller 16.

On the other hand, a reference patch signal generator 42 shown in FIG. 1 is a circuit for prompting generation of a density patch a1. It outputs a calibration reference patch signal to the image output section IOT at the patch preparation timing, whereby the density patch a1 shown in FIG. 3 is prepared.

In this case, the synchronizing circuit 41 determines the operation timing of the reference patch signal generator 42. It monitors a time signal that is output from a clock timer (not shown), and supplies an operation timing signal to the reference patch signal generator 42 so that the density patch a1 is formed at a predetermined position.

B. Operation (1) Initial setting

The operation of the embodiment having the above configuration will be discussed below. First, an initial setting process (function startup process) will be described. First, an engineer sets proper bias and LP set values that are selected as control parameters. The control section 20 prepares a development patch a1, measures with the development density sensor 10, and stores the measurement contents in the control case memory 25 as a control case. Resultantly, the first control case (control case 1; see Table 1) is stored.

Likewise, the engineer stores two more control cases in the control case memory 25 while changing the bias and LP set values. That is, when the controller is started up (within the time during which the state quantities remain the same), the engineer prepares three control cases in total and stores them in the control case memory 25.

The number 3 of control cases mean the number of types of manipulated variables plus 1. Since the embodiment includes two types of manipulated variables, that is, bias and LP set values, 2+1=3. More control cases may be prepared.

When three (number of manipulated variable types plus 1) control cases are stored in the control case memory 25 at the initial setting as described above, the storage contents are supplied via the state quantity comparator 26 and the cluster memory 27 to the control rule arithmetic unit 28, which then determines a control rule. This control rule is extracted as a control case plane as shown in FIG. 8.

Figure 8:
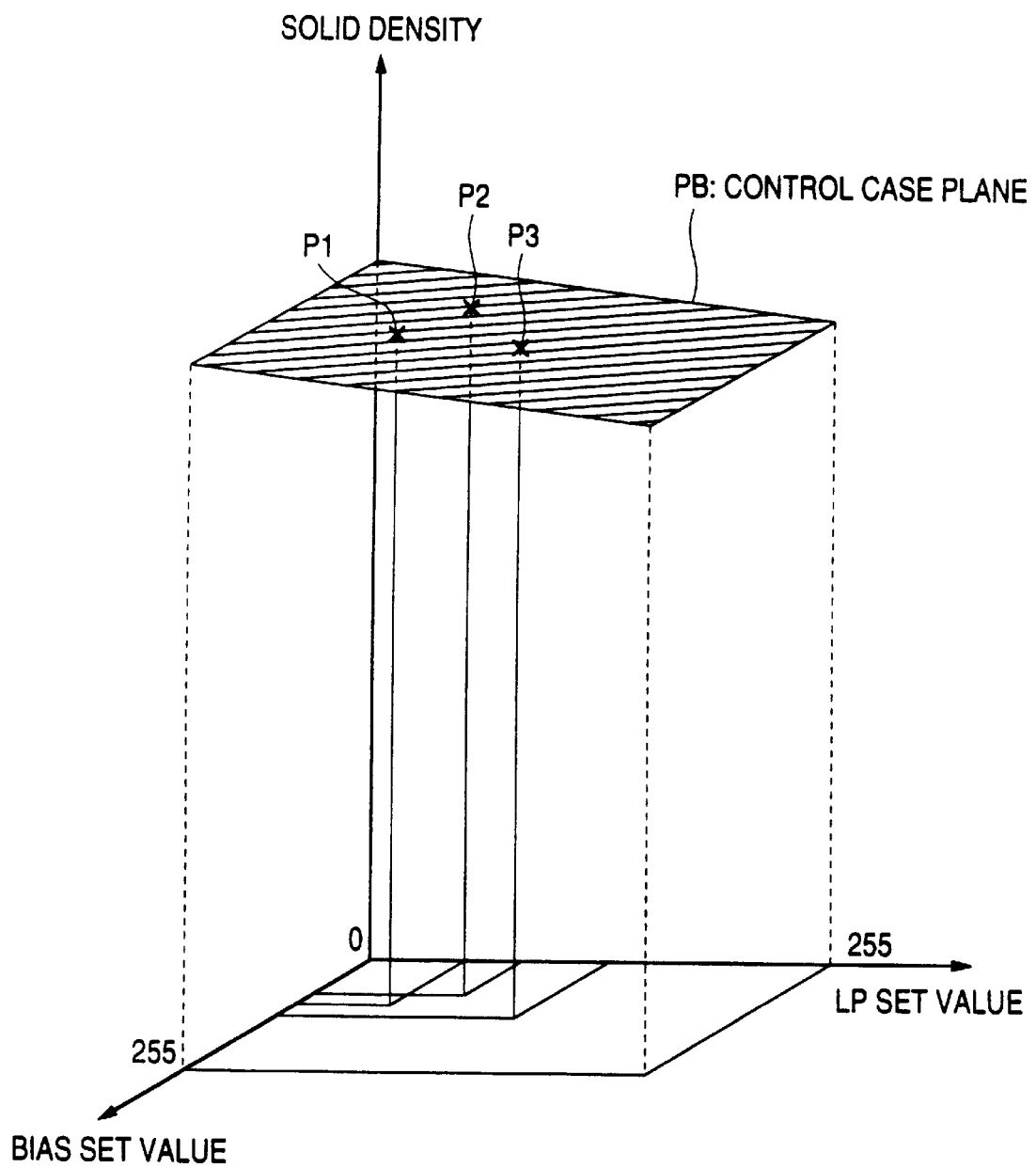
FIG. 8 is a conceptual drawing to show a case plane at the start-up time in the first embodiment.

In FIG. 8, P1, P2, and P3 are points indicating the three control cases in the initial setting, and the plane containing these points P1, P2, and P3 is a case plane BP. All points indicating the solid density provided when the bias and LP set values are changed if the state quantities do not change are included in the case plane BP.

Thus, the case plane BP indicates all cases if the state quantities do not change. In other words, the plane indicates the control rule concerning the solid density at the initial setting. This control rule is stored in the control rule memory 29. The initial setting process in the embodiment is now complete.

Assuming that the number of manipulated variable types is n, the plane indicating the control rule is an n-dimensional plane in an n+1-dimensional space. Therefore, to define it uniquely, n+1 data are required. This is the reason why three cases are required at the initial setting in the embodiment. On the other hand, if n+1 or more cases are collected, statistical processing is applied to them, whereby a higher-reliability control rule can be extracted. As the statistical processing, for example, a calculation method such as a least square error method may be used to determine a plane. Any other method such as an average method may also be used and its processing is arbitrary. The essential point is that an n-dimensional plane be able to be determined based on the control cases.

(2) Operation in service

[Basic operation]

The operation of the embodiment in service will be discussed. It is assumed that actual control is started on the next day with the initial control rule determined as described above.

First, when the image formation apparatus is powered on, automatic setup operation is executed, wherein a density patch a1 is formed by using previous set values per se, for example, at the final image output on the preceding day as the current set values, and the density of the density patch a1 is measured by the development density sensor 10. Assuming that the LP set value is 98 and that the bias set value is 76, the density detected by the development density sensor 10 is plotted in the control case space. FIG. 9 shows an example of the plotting and point P5 shown is a plot point.

The control rule retriever 30 shown in FIG. 1 performs the plotting. That is, it plots the density in the control case plane at the initial setting stored in the control rule memory 29 based on the density transferred from the development density sensor 10 and the LP set value 98 and the bias set value 76 transferred from the manipulated variable memory 32.

By the way, the control case plane is created by plotting output values when one setting is performed in one state. Therefore, if output values differ because some change occurs in the state although the setting remains unchanged, of course, the control case plane does not match that in the preceding state before the change occurs. That is, the above example in which the control contents at the present setup are plotted on the control case plane created at the startup on the previous day (with substantially no distances therebetween) means that the state in which the image formation apparatus at the startup is placed and that in which the image formation apparatus at the present time is placed can be assumed to be substantially the same (in terms of all factors such as the temperature, humidity, and degradation over time that affect the electrophotographic process). The expression "with substantially no distances" means that the difference between the actually output image density and the target density does not exceed the tolerance as a result of a control operation with an assumption that the current control contents are plotted on the control case plane.

Next, the print density of the initial setting or a desired print density specified by the user is converted into a value corresponding to a density sensor output, to determine a target density output value, which is set in the control case space as a target density plane, as described below.

First, the adjustment value set by the operator who handles the density control dial 21 is converted by the converter 22 and the conversion result is stored in the memory 22. The density target value in the memory 22 is transferred via the density comparator 24 to the control rule arithmetic unit 28, which then describes a density target value plane, which is parallel with a scoro set value axis— LP set value axis plane, in the control case space and superimposes it on the control case plane read from the control rule memory 29.

Resultantly, a target density plane TP concerning the solid density is formed, as shown in FIG. 9, in the control case space and the control contents at the time of the above setup are plotted on the target density plane TP.

As shown in FIG. 9, the line on which the control case plane and the target density plane TP cross each other is a target density accomplishment line BTL, which is calculated by the target density accomplishment line arithmetic unit 35 (see FIG. 1). If the present control contents are plotted on the target density accomplishment line BTL, it means that the target density can be accomplished. On the other hand, when the present control contents are not on the target density accomplishment line BTL, if the set values are changed, namely, corrected for selecting a combination of the control contents so that the control contents are plotted on the target density accomplishment line BTL, it can be predicted that the next image output will accomplish the target density.

However, it is not correct to say that any point on the target density accomplishment line BTL can be employed. A point on the target density accomplishment line BTL which should be employed needs to also satisfy the optimization rules. Therefore, a combination of bias and LP set values satisfying the optimization rules as the points on the target density accomplishment line BTL must be determined.

In the embodiment, the manipulated variable correction arithmetic unit 31 determines the manipulated variables by referencing the optimization rules in the optimization rule memory 36.

Figure 10:
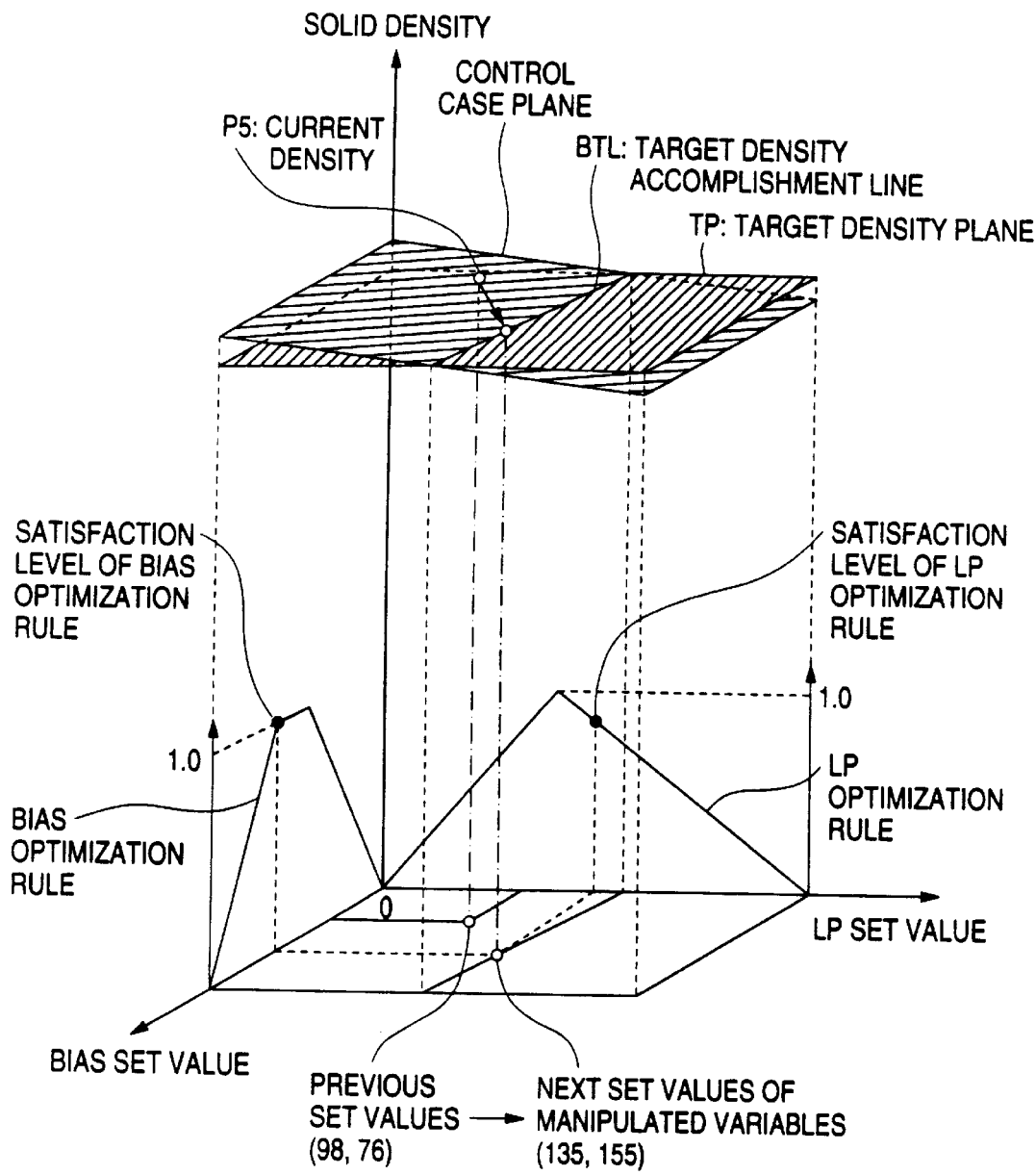
FIG. 10 is a conceptual drawing to show a controlled variable determination process in the first embodiment.

That is, as shown in FIG. 10, the bias and LP optimization rules are applied to the points on the target density accomplishment line BTL to thereby select a combination of the bias and LP set values so as to maximize the product of the bias and LP optimization rule satisfaction levels (135, 155). This combination is determined uniquely.

In the embodiment, the number of manipulated variable types is made greater than the number of controlled variable types to grasp the manipulated variable set values in a continuous relationship of the target density accomplishment line with an added degree of freedom rather than fixing them at one point, thereby finding set values providing the highest satisfaction level in the continuous range. Mathematically, the solution is undefined only with the control rules, and can only be obtained when the optimization rules are also satisfied.

The manipulated variable correction arithmetic unit 31 thus detects the most desirable bias and LP set value pair and transfers the result to the manipulated variable memory 32, which then outputs signals corresponding to the new bias and LP set values to the development bias section 15 and the light quantity controller 16. Thereafter, the optimum LP and scoro set values for accomplishing the target density are set likewise, so that proper image density control can always be performed.

Since the control is performed in the above manner, by applying the optimization rules to the respective manipulated variables, control is so effected that the manipulated variables are restored to ideal values from upper and lower limit values without occurrence of such an event that one manipulated variable is left close to the upper limit value and the other to the lower limit value, for example. Therefore, an event can be avoided that one manipulated variable becomes equal to equal to the upper limit value and the other becomes equal to the lower limit value and that faults caused by the those manipulated variables occur at the same time, which event may occur in the conventional apparatus.

[Cluster generation]

The invention basically accomplishes the target density as described above. However, in practice, the current control contents in service are not always plotted on the control case plane "with substantially no distance therebetween." For the physical mechanism, as the temperature or humidity changes or time-varying degradation develops, the toner charge amount and photoreceptor charge characteristic change, thus the density drastically differs although the LP and development bias set values remain unchanged. For example, when the temperature and humidity are high, the density shifts to the higher side; when they are low, the density shifts to the lower side. That is, if the factors such as the temperature, the humidity, and the degree of degradation over time at the control execution time differ from the already collected and stored control cases to a certain extent or more, the control contents are plotted on the coordinate space at a large distance from the already existing control case plane.

In such a case, if the previous control case plane is used as the present control rules, an reasoning error increases, because the image density reproduction mechanism is physically affected as described above and the control case plane changes. Then, in the invention, when the state changes, a control case is added to the control case memory 25 for preparing a new control case plane comprising the control case group fitted to the new state, whereby the control case plane increases in sequence as required from the state of only one plane at the starting time, such as a control case group in state A, a control case group in another state B, and so forth. In the invention, these are named clusters, namely, cluster A, cluster B, and so forth.

A development patch prepared after execution of the control operation is used to determine whether or not the control result is good, and whether or not a control case is to be added is determined based on the determination result.

Specifically, the density difference between the target density and the actual development patch is read, and whether or not the value is within the tolerance is determined. In the embodiment, the tolerance is defined to be within 3 in terms of color difference, but this value may be set depending on the system.

If the value is within the tolerance, the next control operation is started as described above. If a large error is found exceeding the tolerance, the contents, namely, the control case is added to the control case memory 25 as follows:

First, the density comparator 24 shown in FIG. 1 determines that the value is more than the tolerance, and transfers the output signal of the development density sensor 10 at the time to the control case memory 25, which then stores the state quantities and manipulated variables together with the newly supplied controlled variable as a set. The state quantity comparator 26 determines whether or not the latest cluster is similar to the state based on the new case written into the control case memory 25. That is, the state quantities in control case in the latest cluster, a control case group, are compared with those in the new case written into the control case memory 25. If they are within predetermined quantities, the state is determined to be similar; if they differ exceeding predetermined quantities, the state is not determined to be similar. In the embodiment, the temperature, the humidity, and the cumulative number of print sheets are used as the state quantities as described above, and their similarity degrees are determined.

The definition of similarity may be made considering the specifications of the image formation apparatus, the assumed user specification environment, etc. For example, a humidity variation range in which the state can be considered similar for a toner having a charging characteristic is drastically different from that for a toner having an almost stable charging characteristic. That is, for the former toner, if the humidity changes 5% or more, for example, it is not considered similar. For the latter, even if the humidity changes ±20%, it is still considered in a similar humidity state. In the embodiment, for simplicity, if the temperature, the humidity, and the cumulative number of print sheets are within specified ranges, the state is determined to be similar.

If the state is determined to be similar, to add the control case with respect to the most recent cluster, it is written into the cluster memory 27. At this time, the control rule arithmetic unit 28 calculates such a case plane including the newly added control case and transfers coefficients indicating the plane to the control rule memory 29.

A control rule correction method when control cases increase will be discussed. As described above, assuming that the number of controlled variable types is n, an n-dimensional plane in an n+1-dimensional space is required for controlling them. To define it uniquely, n+1 data points are required. For this reason, three control cases are required in the initial setting in the embodiment. Conversely, if n+1 or more data points exist, statistically a higher-reliability control case group can be provided. Then, the control rule arithmetic unit 28 uses the added control example and the previously stored control examples, namely, n+1 or more data to determine a new control case plane by a calculation method such as a least square error method. The control case plane calculation method is not limited to the least square method and any other calculation method such as an average method may also be used. Any method can be used as long as they can set an n-dimensional plane based on control cases.

If the state is similar, it is considered that essential physical change does not occur and that control rule application becomes poor because of insufficient precision of the past cases (a large measurement error etc.). Thus, the past and new cases are used together to reduce the measurement error statistically. That is, more cases are used to apply statistical processing, thereby creating accurate control rules.

On the other hand, if the state quantity comparator 26 does not determine similarity for the new state quantities written into the control case memory 25, a new cluster is generated and classification is executed. This new cluster is transferred to the cluster memory 27 and a new control case plane (control rule) is calculated by the control rule arithmetic unit 28.

This is because since the system gain being controlled has changed, it is now judged that a new rule is required. In this case, as described above, a new cluster is generated and when new n+1 or more cases have been obtained, a new control case plane, namely, a new control rule is acquired. When the number of control cases is n+1 or less, an insufficient number of cases are replaced tentatively with the latest ones of the past control cases.

Whether or not new control cases are to be collected in addition to n+1 cases can be uniquely determined depending on whether or not a control result obtained with the new control rule that has been created with the n+1 control cases satisfies the tolerance. That is, if the control result satisfies the tolerance, it is judged that a sufficiently accurate control rule is provided. If the control result does not satisfy the tolerance, it is judged that control cases need to be furthermore increased for enhancing the control case plane accuracy. At this time, as described above, the (n+2)th and later control cases are also compared with the (n+1)th and former control cases in state quantities to determine whether or not the same state is continuing.

Whether the control rule is to be improved or a new control rule is to be acquired does not depend on how the same state quantity is judged. That is, the range of the same state quantity may be managed by a given temperature change width or the cumulative number of print sheets; the essential point is that the judgement criterion as to whether or not the state quantity remains the same be able to be determined uniquely.

[Control using clusters in combination]

As seen from the description given above, as the embodiment operates under various conditions, various clusters will be generated. However, when the state changes, a new control case need not always be added to the memory for generating a new cluster. For example, if a cluster for high temperature and a cluster for low temperature which are substantially the same in other conditions like humidity already exist, sufficient control accuracy is often provided for an image formation apparatus operated this time at medium temperature simply by using the high and low temperature clusters in combination without generating a new cluster. In such a case, based on the distances between the current control contents and the control case planes, such a new plane in which the current control contents are included is constructed, and is assumed to be the control case plane adapted to the current state.

Figure 11:
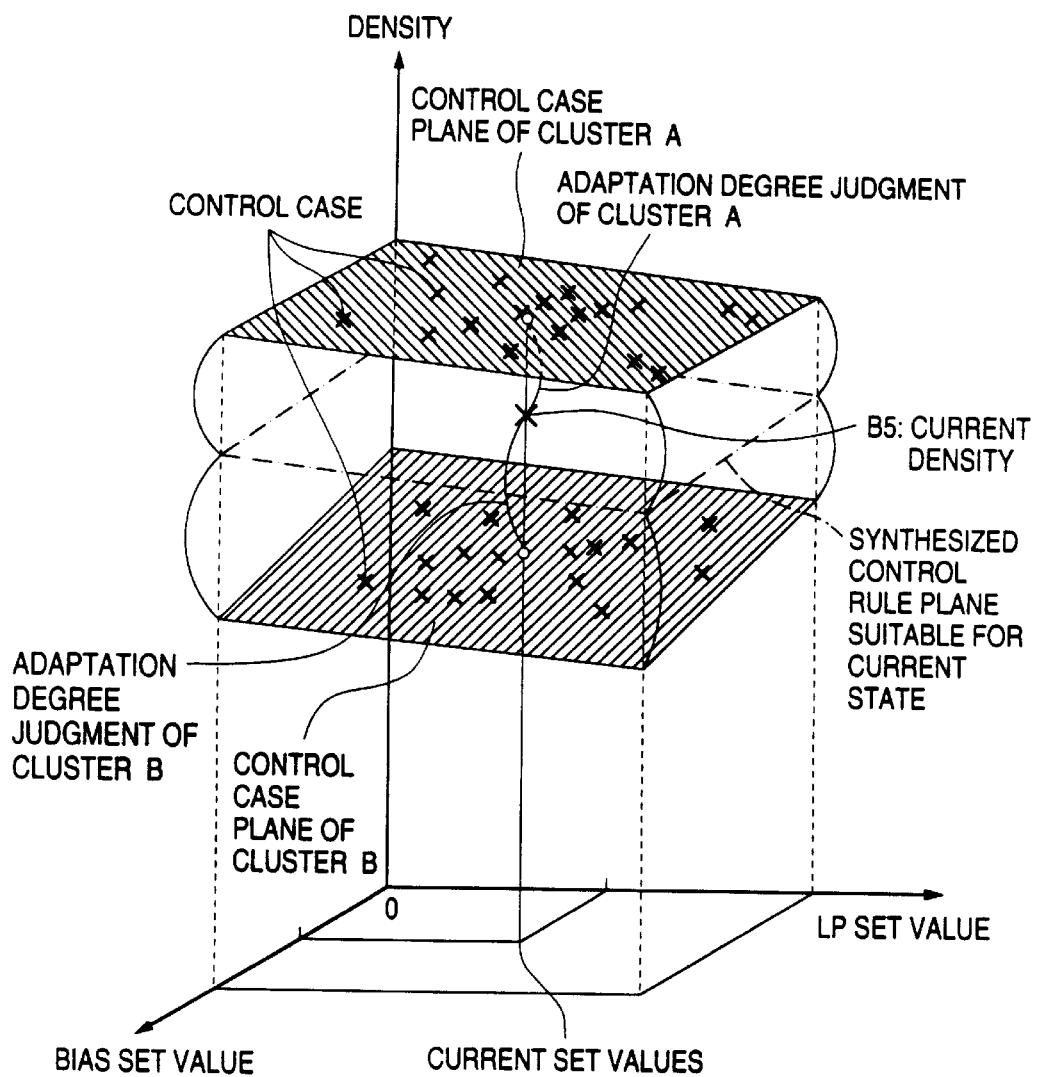
FIG. 11 is a conceptual drawing to show how a new cluster is generated using adaptation degree from past clusters in the first embodiment.

The plane construction using clusters in combination will be discussed with reference to FIG. 11, wherein case planes of clusters A and B are formed and a new plotted point B5 is not positioned on any plane. At this time, the distance between the point indicating the current control contents on the coordinate space, namely, the point B5 and each case plane is calculated. Its reciprocal is found and normalized. That is, the reciprocals of the distances between the point B5 and the respective control case planes are normalized so as to be totaled up to 1. The values thus normalized are defined as adaptation degrees. The inclinations of the respective case planes in each coordinate axis direction are weighted in accordance with the adaption degrees and totaled. The total amount is used as an inclination in each coordinate axis direction of a new control case plane that is adapted to the current state, and the new control case plane is determined so as to have such a height (density axis slice) that the current control contents are contained in the plane.

Such processing is performed if a control case plane having a adaptation degree assumed to be almost 100% cannot be retrieved. The case in which the adaptation degree becomes almost 100% is a case where a newly plotted point is plotted on the control case plane "with substantially no distances therebetween."

The processing is performed in the control rule retriever 30 as follows: First, the point corresponding to the manipulated variables supplied from the manipulated variable memory 32 and the detection value of the development density sensor 10 transferred from the density comparator 25 is plotted on the coordinate plane. The control case planes in the clusters stored in the control rule memory 29 are read in sequence and the distance between each of the control case planes and the new plotted point is found. The "distance" mentioned here is the difference between the controlled variable on calculation provided by assigning the manipulated variables to the control rule and the actually measured controlled variable, and may be not necessarily the shortest distance between the plane and the point. The adaptation degrees are calculated from the distances thus found, and the inclinations of the respective case plane in each coordinate axis direction are weighted in accordance with the adaptation degrees and totaled. The plane having the totaled inclination of each axis is adopted as a new control case plane and the height (density axis slice) of the new control case plane is adjusted so that the plotted point is positioned on the plane. The new control case plane thus created is used to find the next bias and LP set values according to a procedure similar to that shown in FIG. 10.

Just after the startup or with an image formation apparatus with a short operation time or a small number of image formation times, of course, there exists only one control case plane that was created at the startup. Also in this case, the embodiment can handle it in the same manner as a plurality of control case planes exist. That is, if only one control case plane created at the startup exists, the adaptation degree of the plane is 1 (100%), so that the control case plane to be used this time is provided by parallel shifting the control case plane created at the startup in the density axis direction to the position where the current control contents are contained in the plane without changing the inclination of the plane.

On the other hand, a new cluster is generated as described above, if it is estimated that even if the adaptation degree is used to imaginarily construct a new control case plane as described above only with the past control cases, a satisfactory result will not be obtained, that is, the next and subsequent control accuracy will be insufficient unless actual control cases at the present time are collected to improve the control rule (that is, when the density comparator 25 judges that a density error exceeds the tolerance).

Embodiment 2

A. Configuration

Figure 12:
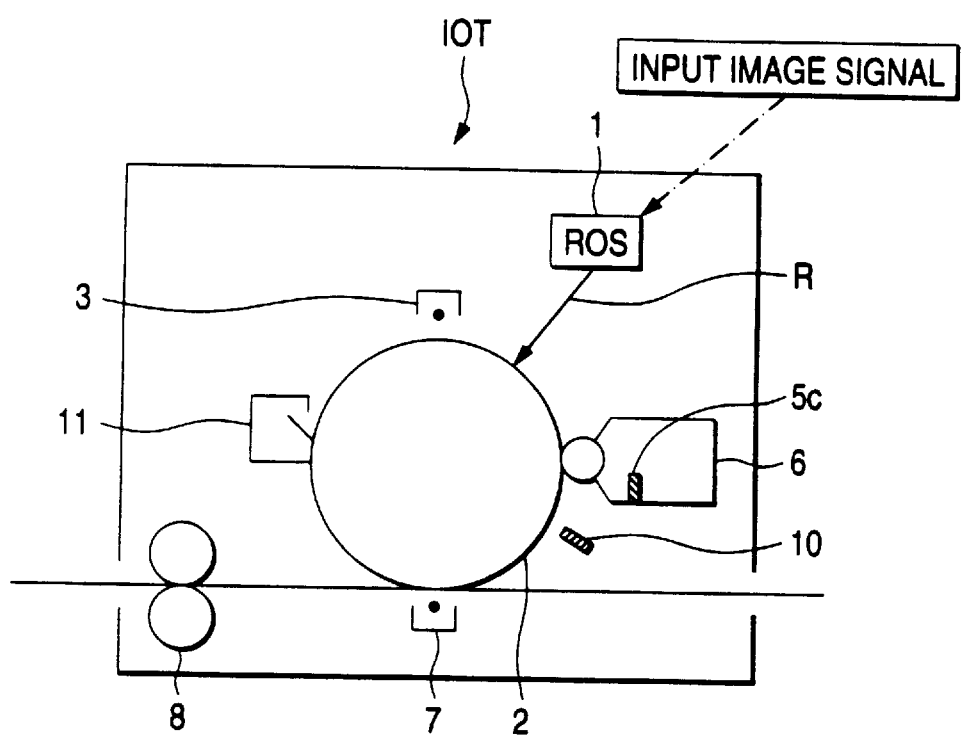
FIG. 12 is a schematic drawing to show the configuration of an image output section in a second embodiment of the invention.

Next, a second embodiment of the invention will be discussed. FIG. 12 is a schematic drawing to show the configuration of the second embodiment of the invention. Like he first embodiment, the second embodiment is an embodiment of applying the invention to an image formation apparatus for controlling the maximum image density (solid density) so that it is kept at a constant value.

The image formation apparatus shown in FIG. 12 is provided with a toner density sensor 5c in place of the temperature sensor 5a and the humidity sensor 5b provided in the first embodiment, because a developing agent and a photoreceptor used in the second embodiment have temperature dependency and humidity dependency weaker than those in the first embodiment. That is, in the second embodiment, monitoring the toner density rather than temperature and humidity as the state quantity is more appropriate for grasping the state.

In more detail, the image formation apparatus of the first embodiment is of higher image quality specification than that of the second embodiment and uses small-particle toner and carrier for high image quality: such a developing agent of a small particle diameter is inferior to a developing agent of a large particle diameter in charging stability. Likewise, the first embodiment also uses the photoreceptor for high image quality, which is more liable to be affected by the environment than a low-sensitivity photoreceptor. For such reasons, the temperature and humidity are monitored in the first embodiment.

The environmental stability of the electrophotographic image formation apparatus is determined mainly by temperature ependency and humidity dependency of the developing agent and photoreceptor. If they are reasonably stable and if the image quality change is within a range as permitted in a commercial product, it can be assumed that the system gains of the image formation apparatus are practically constant independently of the environment. Similarly, if the change over time is at a level as permitted in a commercial product, sufficient control is enabled simply by optimizing control rules at shipment. (Usually, products of this type are not high in required control accuracy and are low-priced.)

The second embodiment aims at such low-priced image formation apparatuses and therefore the temperature and humidity sensors are omitted also for the purpose of cost reduction. The necessity of the toner density sensor 5c will be described later.

Figure 13:
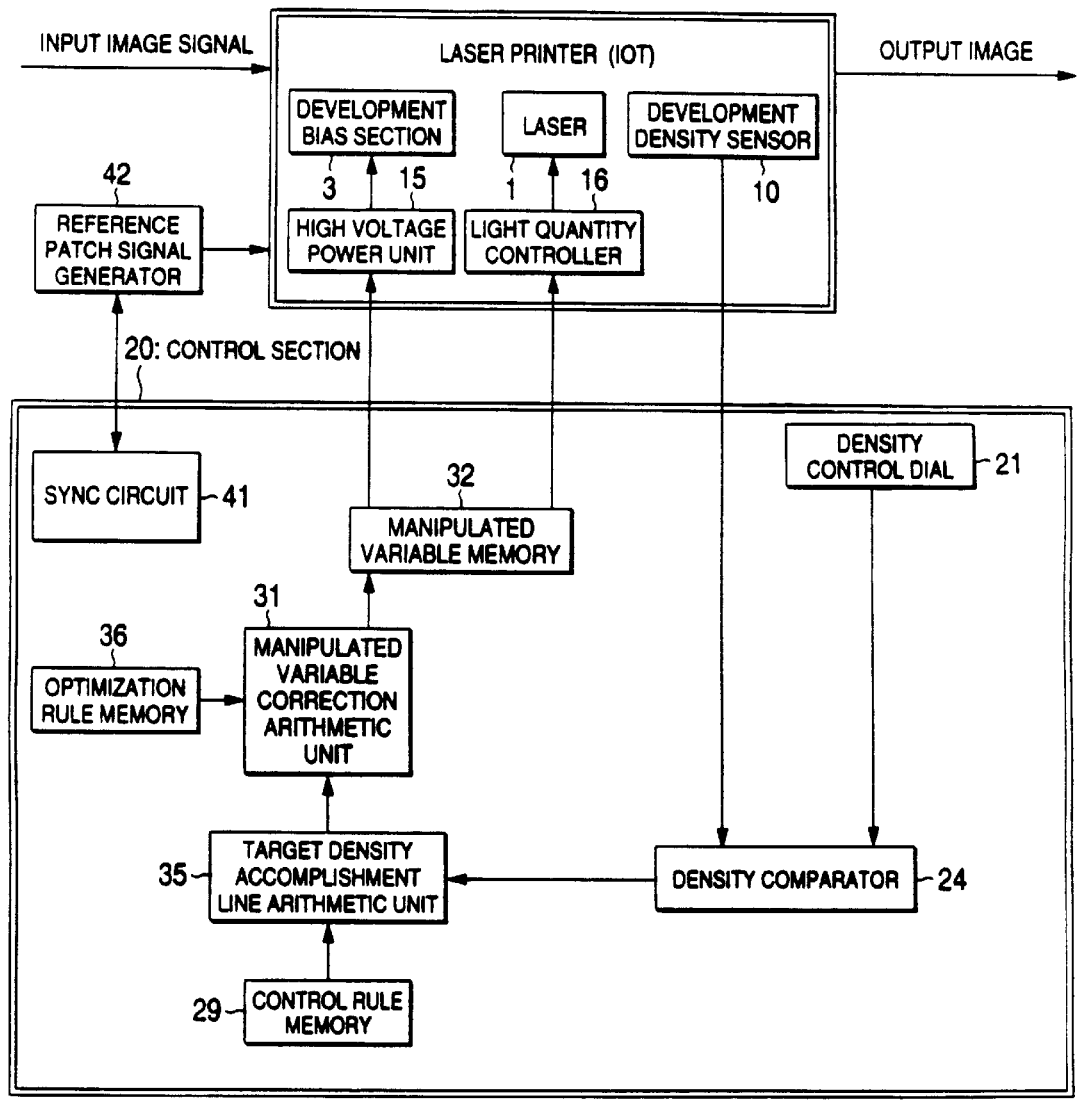
FIG. 13 is a block diagram to show the whole configuration of the second embodiment of the invention.

Next, the configuration of a controller in the second embodiment will be discussed with reference to FIG. 13. The configuration of the second embodiment shown in FIG. 13 differs from that of the first embodiment in FIG. 1 in that it does not contain control rule generation and updating components because the second embodiment, which aims at comparatively inexpensive systems and previously fixes the system gains at the development stage, does not generate new control rules.

That is, in the second embodiment, optimum system gains are determined based on the data collected at the time of development and is finely adjusted for each machine and results are stored in a control rule memory 29.

The system gains as mentioned here are a percentage of "a necessary variation in laser power in response to a density error" and a percentage of "a necessary variation in development bias for a similar correction." Therefore, if a control rule is given by (density correction amount)=$A$×(laser power correction amount)+$B$×(development bias correction amount), $A$ and $B$ are system gains.

Even in an image formation apparatus having weak environment dependency, the coefficients $A$ and $B$ at high temperature and humidity usually differ from those at low temperature and humidity. It is therefore a common procedure to collect data under various conditions at the time of development and determine the coefficients $A$ and $B$ at values that are statistically most likely considered average values. Alternatively, the coefficients $A$ and $B$ may be determined experimentally for most representative conditions of a user class assumed for the image formation apparatus concerned (for example, year-round room temperature of 20°–25° in an air-conditioned office).

Since values of the coefficients $A$ and $B$ thus determined vary from one image formation apparatus to another even if they are of the same model, gain adjustment is executed at the factory as adjustment before shipment.

Next, toner used in the second embodiment will be discussed.

Like the first embodiment, the second embodiment also uses a two-component development system, wherein the toner density in a developing agent, namely, the mixing ratio between the toner and carrier affects the development density. In the first embodiment, the toner supply amount is controlled to be almost constant such that it is made proportional to the number of pixels of an image to be output. This is because even if there occurs a slight variation in toner density, gains suitable for a toner density at each time can be automatically optimized by learning of cases.

However, since the gains are fixed in the second embodiment, the preset toner density needs to be maintained all the time. Thus, the second embodiment is provided with the toner density sensor 5c, which is not required in the first embodiment.

The second embodiment adopts a generally used magnetic sensor as the toner density sensor 5c, but any other type of sensor such as an optical sensor may be adopted if it can provide sufficient accuracy.

If a single-component development system is used, the toner density, which is always 100%, does not directly affect the image density. Thus, only toner amount management such as empty detection of a developing agent is required in the second embodiment as in the first embodiment.

B. Operation

Next, the operation of the second embodiment will be discussed.

Assume that the output value of a development density sensor 10 is D1 when a development bias and laser power are set at B1 and L1. At this time, the value D1 is compared with the target density (let it be D0) by a density comparator 24 and a density error to be corrected, ΔD1, is output.

On the other hand, since the control rule is fixed according to the gains preset in the control rule memory 29, a target density accomplishment line arithmetic unit 35 calculates all combinations of development bias and laser power to correct for the density error ΔD1 as a target density accomplishment line as in the first embodiment (see FIG. 9).

In general, if the number of manipulated variable types is n, the control rule plane is an n-dimensional plane in an n+1-dimensional space. Therefore, if control rules of a number that allows unique determination this relationship are preset, n−1 types of controlled variables can be controlled independently, as in the first embodiment.

Figure 14:
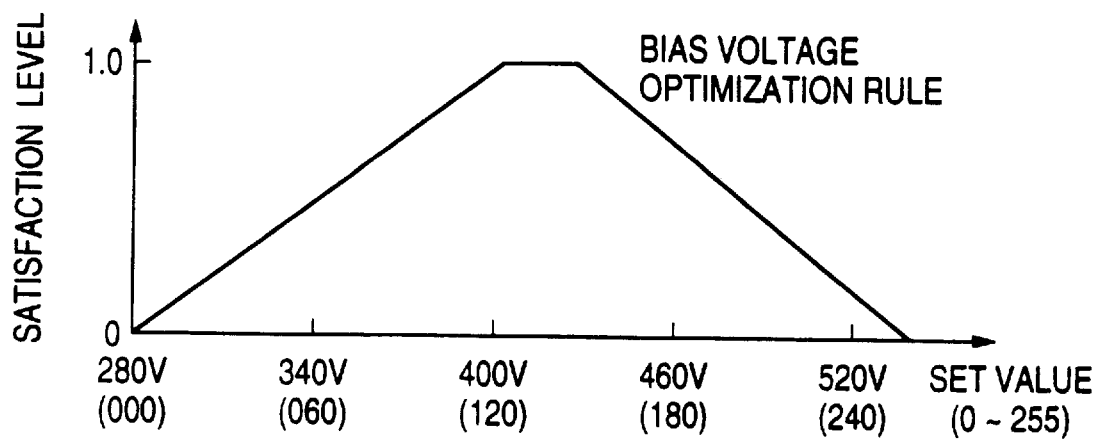
FIG. 14 is a graph to show a bias voltage optimization rule in the second embodiment.

"Optimization rules" are also set in the second embodiment like the first embodiment. That is, to provide control that hardly causes a secondary fault, rules defining degrees of satisfaction of the development bias and the laser power are set as shown in FIGS. 14 and 15 in an optimization rule memory 36.

Figure 15:
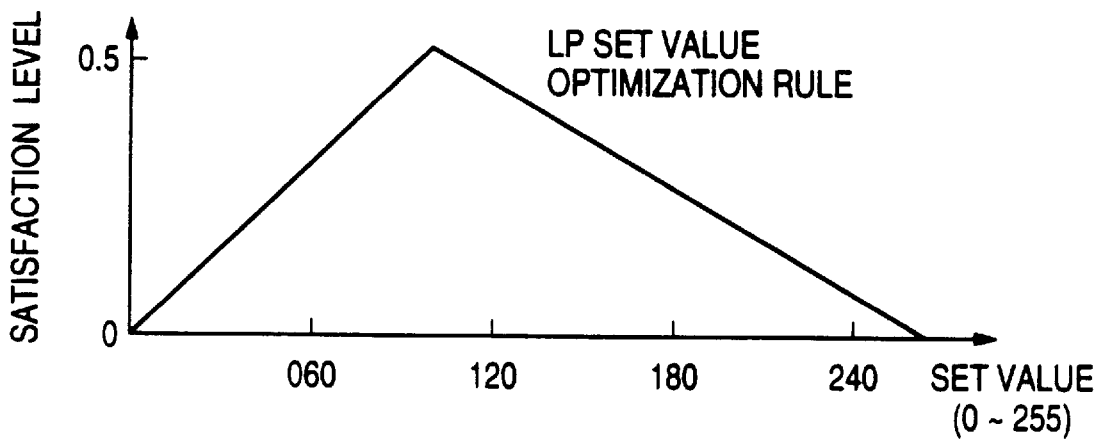
FIG. 15 is a graph to show an LP set value optimization rule in the second embodiment.

The laser power set value optimization rules shown in FIGS. 15 and 7 differ in vertical axis scale, because the development characteristic of the image formation apparatus in the second embodiment, particularly proneness to an image defect, depends more strongly on the laser power set value than the bias voltage set value and the above scaling is more effective in quantifying the optimization degree of the entire image formation apparatus.

In the second embodiment, a manipulated variable correction arithmetic unit 31 operates to quantitatively select one combination of manipulated variables which combination is most suitable when all the factors are taken into consideration from among combinations of manipulated variables on the target density accomplishment line determined by the target density accomplishment line arithmetic unit 35 as in the first embodiment. As a specific method, a manipulated variable having a smaller optimization rule satisfaction level in each combination is selected and the manipulated variables thus selected are compared with each other. And a combination containing the manipulated variable having the largest satisfaction level among them is selected.

This point will be discussed more specifically. First, assume that manipulated variable combinations A–C as listed in Table 2 can accomplish the target density and that the satisfaction levels for each manipulated variable are values listed in the table.

TABLE 2

|   | Manipulated variable setting values Bias/LP | Satisfaction level Bias/LP |
|---|---|---|
| A | 58/101 | 0.483/0.495 |
| B | 59/99 | 0.492/0.485 |
| C | 60/97 | 0.500/0.475 |

Each underlined manipulated variable listed in Table 2 is the manipulated variable having the smaller satisfaction level in each combination, namely, bias 0.483 in combination A, laser power 0.485 in combination B, and laser power 0.475 in combination C. When they are compared, the largest value is 0.485 in combination B and therefore the manipulated variables of combination B are selected in Table 2.

Since satisfaction level weighting between the manipulated variables as shown in FIGS. 14 and 15 is performed together with the above selection, importance is attached to the manipulated variable having a larger effect for selection. That is, in the embodiment, the laser power is defined as a satisfaction level twice as severe as that of the bias voltage, so that importance is attached to the laser power for selection.

By performing the above processing, manipulated variable setting which can correct a density error as well as is most unlikely to cause secondary faults such as an image defect and life shortening can be accomplished.

The numeric values listed in Table 2 are for convenience for aiding in understanding, and normally a large number of combinations are listed up over a variable range of the manipulated variables. (For digital control as in the embodiment, each manipulated variable is often set in the range of 0 to 255 and a maximum of 255 sets are listed up.)

Modifications

The first and second embodiments have the following modifications:

(1) Although the first embodiment uses two-component toner, of course the invention can also be applied a case of single-component toner.

(2) The first and second embodiments are embodiments of applying the invention to an image formation apparatus, but application of the invention is not limited to an image formation apparatus, needless to say.

What is claimed is:

1. An open-loop system controller for controlling, based on a given control rule, a controlled system so that one or a plurality of controlled variables reach respective target values, said system controller comprising:

optimization rule storing means for storing optimization rules for respective manipulated variables;

first detecting means for detecting combinations of values of the respective manipulated variables which combinations allow the respective controlled variables to reach the respective target values, said target values input by a user;

second detecting means for detecting, from the combinations detected by the first detection means, a combination that provides a maximum satisfaction level of the optimization rules; and control means for controlling the controlled system by using the values of the manipulated variables detected by the second detecting means, wherein the number of the manipulated variables is set greater than the number of the controlled variables; and wherein state quantities are input to the system controller from the controlled system, said state quantities being different from the said controlled variables.

2. An open-loop system controller for controlling a controlled system so that one or a plurality of controlled variables reach target values by using a control rule that is automatically extracted based on past control cases, said system controller comprising:

optimization rule storing means for storing optimization rules for respective manipulated variables;

first detecting means for detecting combinations of values of the respective manipulated variables which combinations allow the respective controlled variables to reach the respective target values, said target values input by a user;

second detecting means for detecting, from the combinations detected by the first detection means, a combination that provides a maximum satisfaction level of the optimization rules; and control means for controlling the controlled system by using the values of the manipulated variables detected by the second detecting means, wherein the number of the manipulated variables is set greater than the number of the controlled variables; and wherein state quantities are input to the system controller from the controlled system, said state quantities being different from said controlled variables.

3. The system controller as claimed in claim 1 wherein the optimization rules are defined by respective fuzzy membership functions.

4. The system controller as claimed in claim 3, wherein the fuzzy membership functions are weighted for the respective manipulated variables.

5. An open-loop system controller for separately determining values of a plurality of manipulated variables that change one or a plurality of controlled variables for controlling a system so that the controlled variable reaches a target value, said system controller comprising:

optimization rule storing means for storing optimization rules each indicating a relationship between a corresponding one of the manipulated variables and a satisfaction level thereof;

control rule storing means for storing, as a control rule, a function correlating the manipulated variables and the controlled variable which function is determined based on values of the manipulated variables actually applied to the system and a corresponding value of the controlled variable, the number of the manipulated variables being greater than that of the controlled variables;

means for setting the target value for the controlled variable;

manipulated variable equation calculating means for calculating, based on the stored control rule, an equation including only the manipulated variables and indicating combinations of values of the manipulated variables which combinations allow the controlled variable to reach the set target value;

means for determining a combination of values of the manipulated variables which combination maximizes an overall satisfaction level of the optimization rules by applying the optimization rules to the respective manipulated variables of the equation; and means for controlling the system by using the determined values of the manipulated variables.

6. The system controller as claimed in claim 5, wherein the equation is a target density accomplishment line.

7. The system controller as claimed in claim 5, wherein the control rule is newly determined based on values of the manipulated variables actually applied to the system and a corresponding value of the controlled variable.

8. The system controller as claimed in claim 5, wherein the satisfaction level of each of the manipulated variables relates to a life of means for changing the manipulated variable.

9. The system controller as claimed in claim 5, wherein the satisfaction levels of the respective manipulated variables relate to a life of means different from means for changing the manipulated variables.

10. The system controller as claimed in claim 5, wherein the satisfaction levels of the respective manipulated variables relate to a secondary fault caused by the manipulated variables.

11. The system controller as claimed in claim 5, wherein the satisfaction levels of the manipulated variables relate to the system.

12. The system controller as claimed in claim 5, wherein variation ranges of the respective manipulated variables are substantially limited by the respective satisfaction levels.

13. An open-loop system control method for separately determining values of a plurality of manipulated variables that change one or a plurality of controlled variables for controlling a system so that the controlled variable reaches a target value, said method comprising the steps of:

determining optimization rules each indicating a relationship between a corresponding one of the manipulated variables and a satisfaction level thereof;

storing, as a control rule, a function correlating the manipulated variables and the controlled variable which function is determined based on values of the manipulated variables actually applied to the system and a corresponding value of the controlled variable, the number of the manipulated variables being greater than that of the controlled variables;

calculating, based on the stored control rule, an equation including only the manipulated variables and indicating combinations of values of the manipulated variables which combinations allow the controlled variable to reach the target value said target values input by a user;

determining a combination of values of the manipulated variables which combination maximizes an overall satisfaction level of the optimization rules by applying the optimization rules to the respective manipulated variables of the equation; and controlling the system by suing the determined values of the manipulated variables.

14. The method as claimed in claim 13, wherein the equation is a target density accomplishment line.

15. The method as claimed in claim 13, wherein the control rule is newly determined based on values of the manipulated variables actually applied to the system and a corresponding value of the controlled variable.

16. The method as claimed in claim 13, wherein the satisfaction level of each of the manipulated variables relates to a life of means for changing the manipulated variable.

17. The method as claimed in claim 13, wherein the satisfaction levels of the respective manipulated variables relate to a life of means different from means for changing the manipulated variables.

18. The method as claimed in claim 13, wherein the satisfaction levels of the respective manipulated variables relate to a secondary fault caused by the manipulated variables.

19. The method as claimed in claim 13, wherein the satisfaction levels of the manipulated variables relate to the system.

20. The method as claimed in claim 13, wherein variation ranges of the respective manipulated variables are substantially limited by the respective satisfaction levels.

* * * * *